United States Patent
Mora et al.

[19]

[11] Patent Number: 5,960,531
[45] Date of Patent: Oct. 5, 1999

[54] DRILL PRESS WITH SWITCHED RELUCTANCE MOTOR

[75] Inventors: Ludwin Mora, Plainsboro, N.J.; Michael L. O'Banion, Westminster, Md.; Richard K. Pallo, Buckingham, Pa.; Robert P. Welsh, Hunt Valley, Md.

[73] Assignee: Black & Decker Inc., Newark, Del.

[21] Appl. No.: 09/020,484

[22] Filed: Feb. 9, 1998

Related U.S. Application Data

[63] Continuation-in-part of application No. 08/714,714, Sep. 16, 1996, Pat. No. 5,765,273
[60] Provisional application No. 60/045,183, Apr. 30, 1997, abandoned, and provisional application No. 60/004,187, Sep. 22, 1995, abandoned.

[51] Int. Cl.$^6$ ..................................................... B23P 23/00
[52] U.S. Cl. ............................... 29/560; 108/4; 269/71; 408/87; 408/103; 408/110; 409/220; 409/227
[58] Field of Search .................................... 29/560, 26 A; 408/87, 89, 90, 91, 110, 103, 234, 708, 712; 409/164, 165, 220, 224, 227, 221; 269/69, 70, 71, 76; 108/4, 6, 8, 144, 147; 318/245, 798

[56] References Cited

U.S. PATENT DOCUMENTS

| | | | |
|---|---|---|---|
| 54,248 | 4/1866 | Eddy | 408/87 |
| 324,759 | 8/1885 | Elliott | 408/87 |
| 1,864,840 | 6/1932 | Lehner | 144/287 |
| 2,668,568 | 2/1954 | Budd | 144/135.2 |
| 3,794,089 | 2/1974 | Morse | 144/1 C |
| 4,184,395 | 1/1980 | Blachly et al. | |
| 4,375,827 | 3/1983 | Ignjatic | 144/286 R |
| 4,401,142 | 8/1983 | Linossi | 144/1 R |
| 4,453,691 | 6/1984 | Hochstatter | |
| 4,497,353 | 2/1985 | Sproat, Jr. | 144/1 R |
| 4,958,544 | 9/1990 | Miyamoto | |
| 5,398,740 | 3/1995 | Miller | 144/286 R |
| 5,431,206 | 7/1995 | McAllister | 144/286 R |
| 5,440,218 | 8/1995 | Oldenkamp | 318/701 |
| 5,517,746 | 5/1996 | Cox et al. | 29/560 |
| 5,547,319 | 8/1996 | Pollak | 408/90 |
| 5,562,135 | 10/1996 | Beth et al. | 144/1.1 |
| 5,765,273 | 6/1998 | Mora et al. | 409/220 |
| 5,820,349 | 10/1998 | Caillat | 417/44.1 |

FOREIGN PATENT DOCUMENTS

| | | |
|---|---|---|
| 0709155 | 1/1996 | European Pat. Off. |
| 42 25 887 | 2/1994 | Germany. |
| 2055638 | 7/1990 | United Kingdom. |

*Primary Examiner*—Daniel W. Howell
*Assistant Examiner*—Christopher Kirkman
*Attorney, Agent, or Firm*—Adan Ayala

[57] ABSTRACT

Disclosed herein is a drill press including a vertical support post, a pivot assembly supported upon the support post, the pivot assembly being pivotable about a vertical axis defined by the post, a table supported on the pivot assembly, a head supported by the post at a location above the table, a rotatable chuck supported by the head, an induction motor driving the chuck; and a detent mechanism disposed between the pivot assembly and the post for identifying when the table is in a central location under the chuck.

23 Claims, 16 Drawing Sheets

DRILL PRESS WITH SWITCHED RELUCTANCE MOTOR

CROSS-REFERENCE TO RELATED APPLICATIONS

The present application is based upon and claims priority under 35 USC § 119 and 37 CFR § 1.78 of copending U.S. provisional application Serial No. 60/045,183, filed on Apr. 30, 1997 now abandoned. The present application is also a continuation-in-part of U.S. application Ser. No. 08/714,714, filed on Sep. 16, 1996 now U.S. Pat. No. 5,765,273, which in turn is based upon U.S. provisional application Serial No. 60/004,187, filed on Sep. 22, 1995, now abandoned.

BACKGROUND OF THE INVENTION

1. Field of Invention

The present invention relates to a drill press with a switched reluctance motor, and more particularly, to a drill press with a switched reluctance motor having a variable speed and automatic braking for operating a mounted drill bit.

2. Description of the Prior Art

Most prior art drill presses use universal motors and gear or belt reduction drives to power a mounted drill bit. For turning the universal motor on and off in a convenient manner, a switch is utilized. Recent models of prior art drill presses may also employ a brake to shorten the coast downtime of a mounted drill bit. This is accomplished by reconnecting the universal motor into a short circuited generator. This is sometimes referred to as "regenerative" braking or "dynamic" braking. A separate circuit operated by a second contact of the switch engages and disengages the brake. Unfortunately, the optimum brush timing, or "brush lead," is different for a motor and a generator. Thus, braking the motor in the manner described above increases wear and tear on the motor brush and commutator. In addition, the braking action of a universal motor decreases sharply as the motor slows down, increasing the total stopping time.

As will be seen in the discussion that follows, the present invention employs a switched reluctance motor which eliminates the aforementioned problems associated with universal motors, particularly those that employ regenerative or dynamic braking.

SUMMARY OF THE INVENTION

The present invention is directed to a drill press having a switched reluctance motor. The drill press may also include a vertically disposed support post and a pivot assembly supported upon the support post. A table is supported on the pivot assembly. The pivot assembly is pivotable about a first substantially horizontal axis, with the table pivoting about the first horizontal axis jointly with the pivot assembly. The table also is pivotable relative to the pivot assembly about a second substantially horizontal axis.

DETAILED DESCRIPTION

Figure 1:
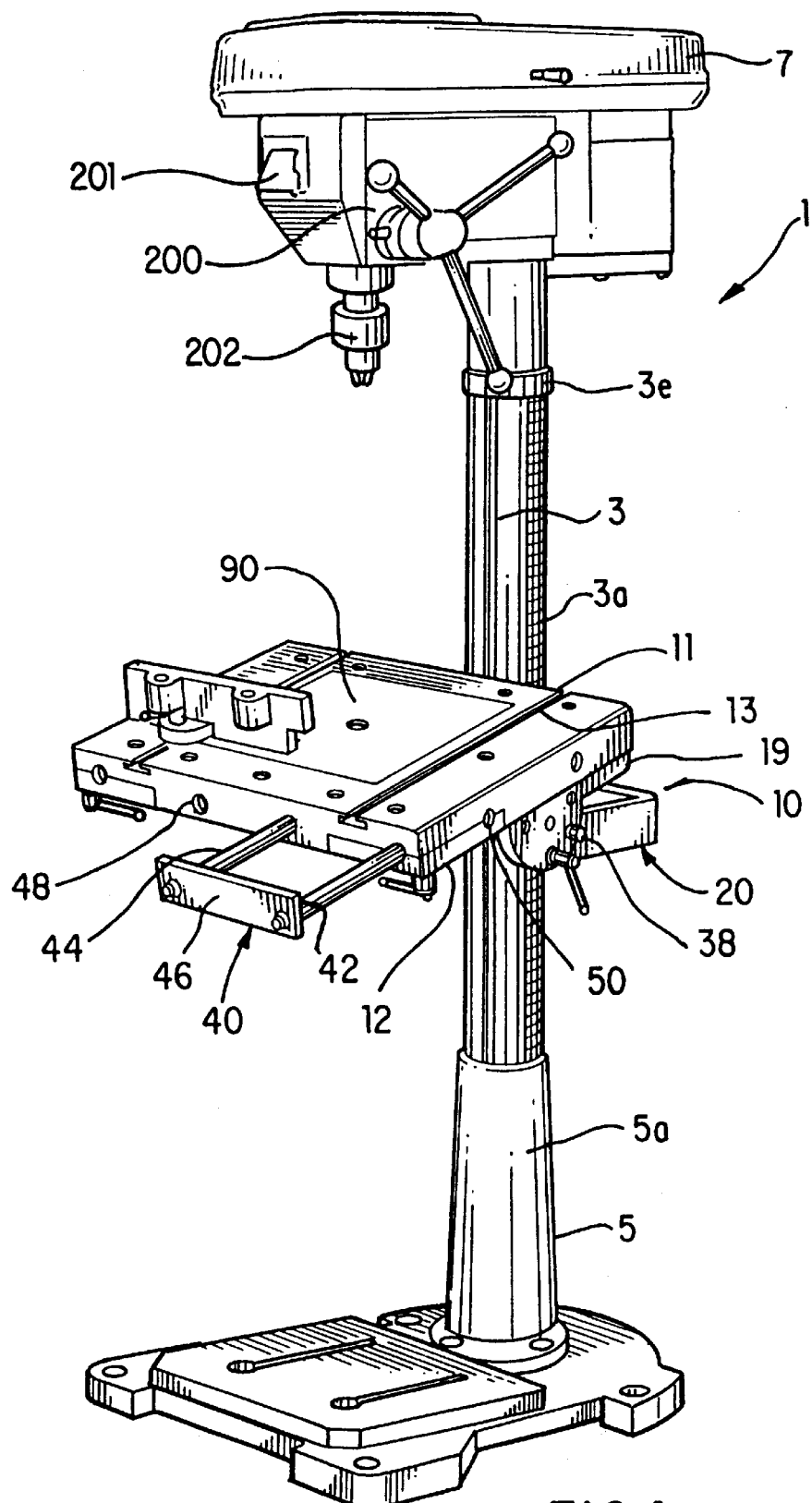
FIG. 1 is a perspective view of a drill press according to the present invention.
Figure 2:
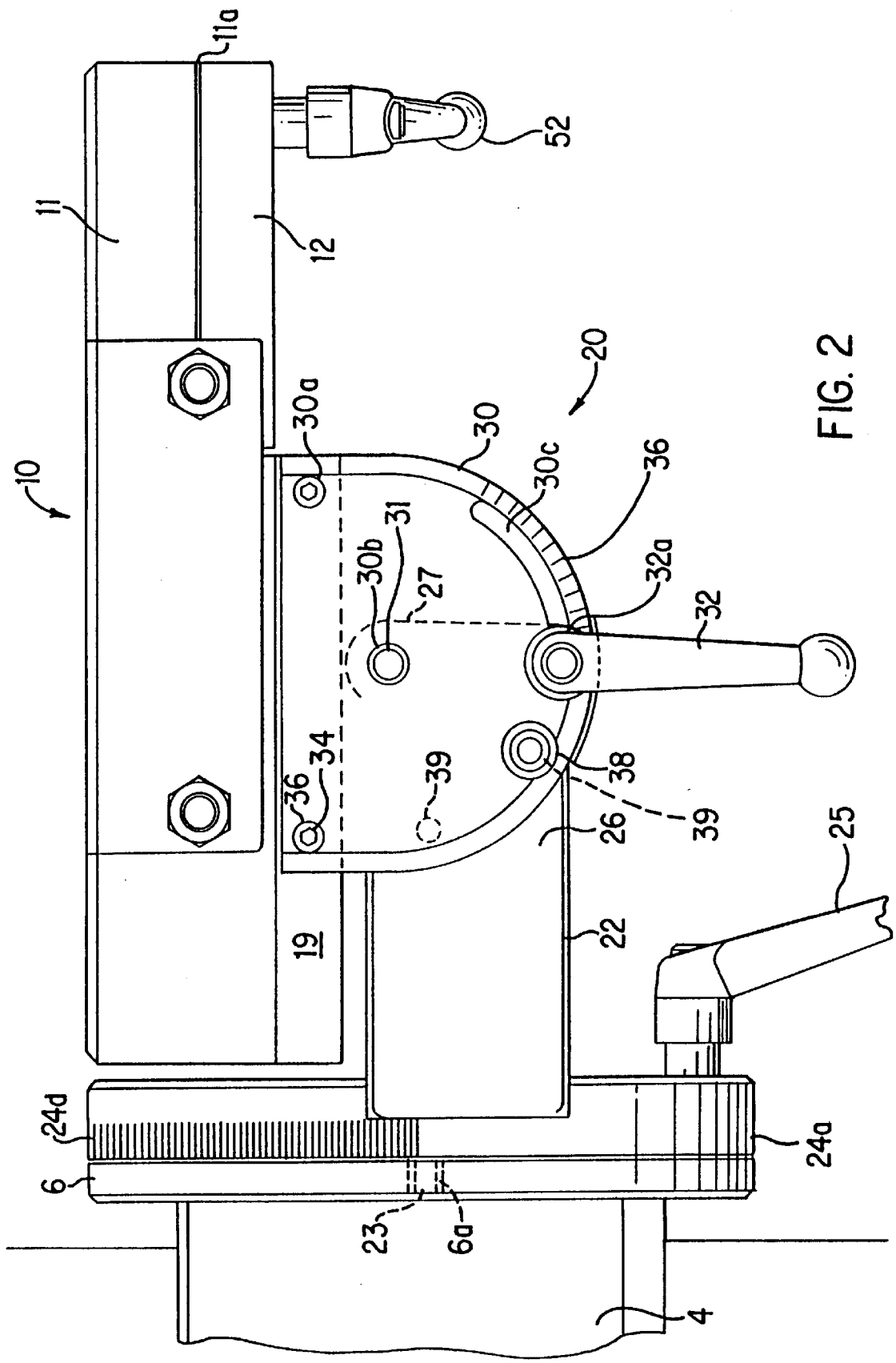
FIG. 2 is a left side elevational view of a drill press table assembly forming part of the drill press shown in FIG. 1.
Figure 3:
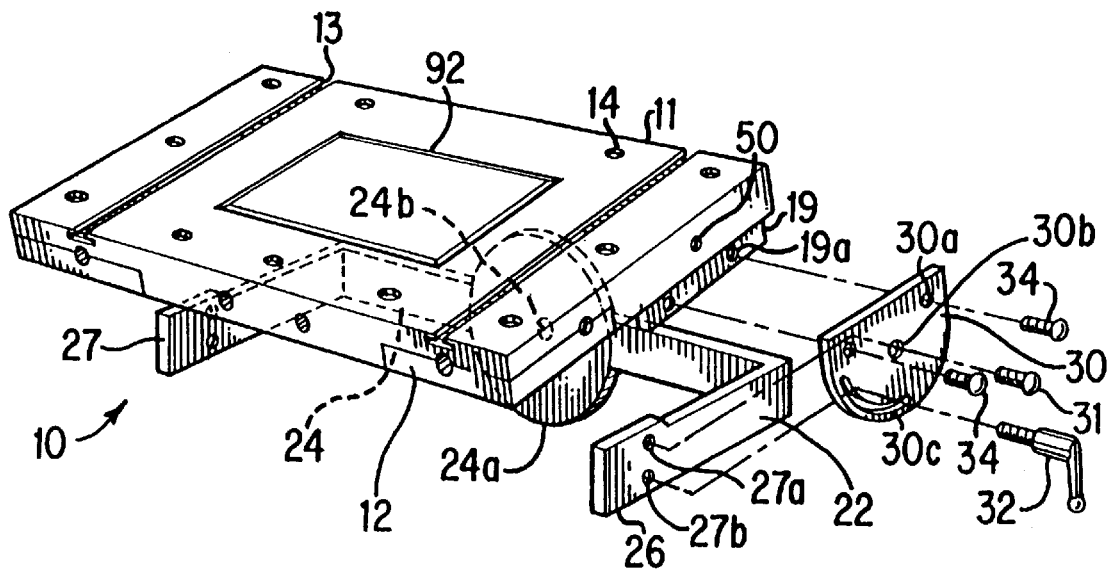
FIG. 3 is a perspective view showing components of the table assembly of FIG. 2.

With reference to FIGS. 1 and 2, drill press 1 includes main support post 3, base 5 and head 7. Support post 3 may have a hollow cylindrical shape and fits within an opening formed in base 5 and is supported by base 5 to extend vertically. Head 7 includes an opening which receives post 3 and is supported thereby. A conventional chuck 202 and rotatable handle for raising or lowering the chuck extend from head 7 and do not form part of the invention. Similarly, a conventional drive mechanism for the chuck 202 is disposed within head 7. Also disposed within head 7 is motor 200 for driving chuck 202 and switch 201 for turning motor 200 on or off. The motor 200 can be a universal motor that is connected to a belt or gear reduction drive for driving the chuck 202. However, it is preferable to use a switched reluctance motor instead as the motor 200 in the drill press 1.

Figure 17:
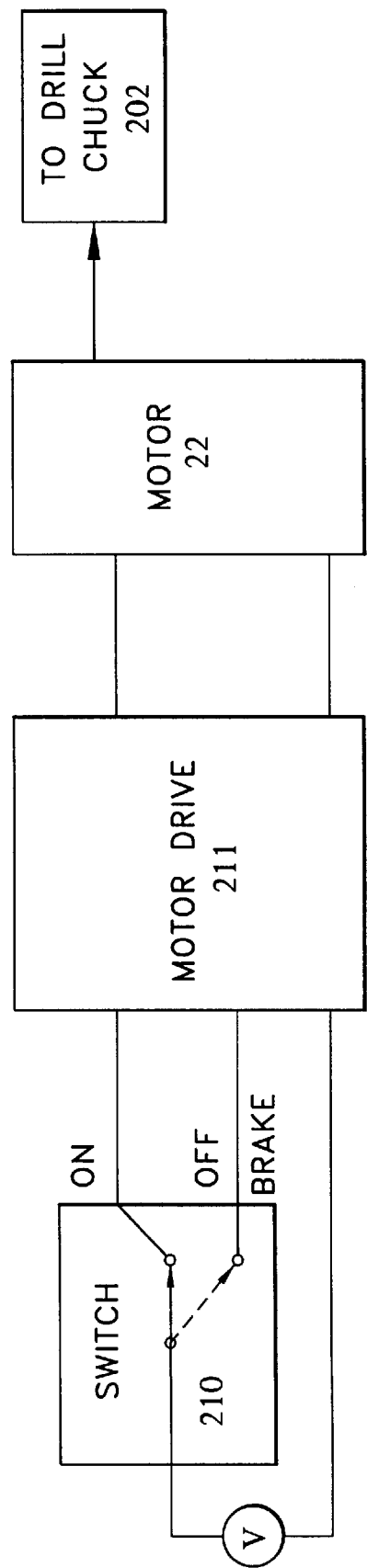
FIG. 17 is a block diagram of a control circuit for operating a switched reluctance motor that drives the rotatably mounted saw blade.

As shown in FIG. 17, a schematic control circuit is illustrated showing the switched reluctance motor 200 electrically connected to the electronic motor drive 203 and operated by the switch 201 in the head 7 of the drill press 1. As in prior drill presses, the switch 201 may include first and second contacts. Thus, upon activation of the switch 201, the switched reluctance motor 200 is energized to drive the chuck 202. Upon disactivation of the switch 201, the second contact can be electrically connected to the electronic motor drive 203 to brake the switched reluctance motor 200. This will be similar to the present practice.

Alternatively, the electronic motor drive 203 can be configured to sense that the switch 201 is open and then automatically brake the switched reluctance motor 200. Thus, the electronic motor drive 203 can be configured in any desired manner to work in conjunction with the switch 201 to brake the switched reluctance motor 200.

Other variations are possible including the addition of a variable speed control to the switched reluctance motor 200. Another variation can include a soft start, i.e., relatively slow ramp up of motor speed, in the electronic motor drive 203 in order to reduce the strain on a gear reduction drive as well as reduce the starting in rush current to the switched reluctance motor 200. This is an advantage when long extension cords are used.

From the foregoing, it will now be appreciated that the drill press with switched reluctance motor eliminates wear and tear on brushes and commutators as in prior art universal motors as well as eliminates regenerative or dynamic braking associated with the universal motor. Wear and tear is substantially eliminated because switched reluctance motors rely upon semiconductor switches and complex logic to operate. Because switched reluctance motors are capable of braking, as a result of the semiconductor switches and logic, they can be controlled to provide braking down to near zero speed, thus reducing the total stopping time.

Referring to FIGS. 1 and 2, cylindrical casting 4 is disposed about support post 3 and circular plate 6 is fixedly secured to casting 4. Table assembly 10 is secured to circular plate 6. Circular plate 6 includes central opening 6a formed therethrough and pointer 6b (FIG. 8) disposed generally at the uppermost point on the circumference.

With further reference to FIGS. 2, 3, 5 and 7, table assembly 10 further includes table 11 which is secured to pivot assembly 20. Table 11 has a reduced thickness at the left and right front corners so as to form generally square cut-out regions 11a. Clamp plates 12 are removably disposed in cut-out regions 11a, as described further below. Table assembly 10 further includes rectangular brackets 19 which extend downwardly from the lower surface of table 11. Brackets 19 include two holes 19a and extends forwardly from the rear of table 11 to a termination point just to the rear of cut-out regions 11a.

Figure 8:
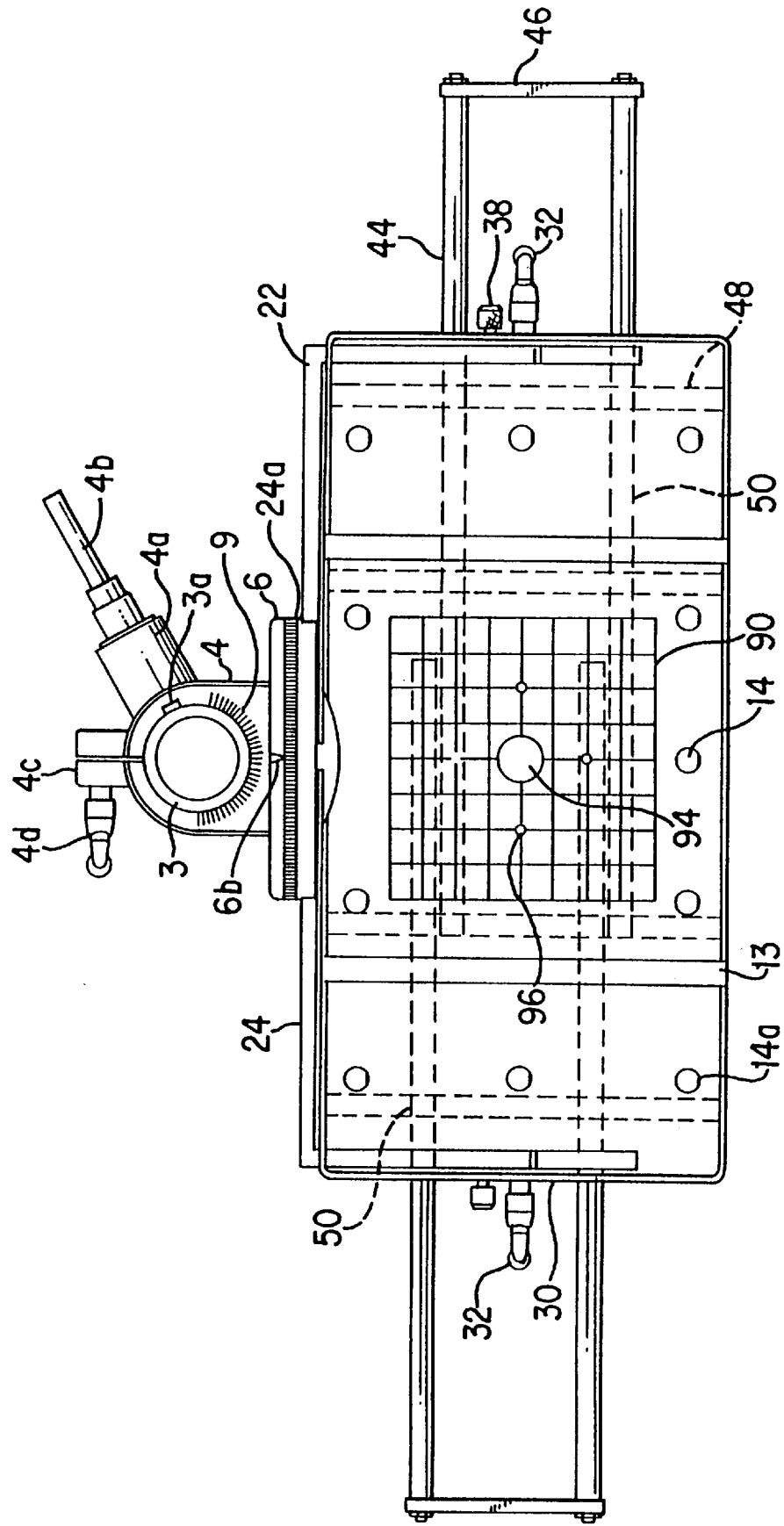
FIG. 8 is an overhead plan view of the drill press shown in FIG. 2.

Table 11 further includes two slots 13 formed in the upper surface. Slots 13 extend from front to rear of table 11 and have a T-shaped cross-section formed by opposite, overhanging lips 13a. A plurality of circular vertical openings 14 are formed through the upper surface of table 11. Preferably, openings 14 extend entirely through the width of table 11. A plurality of horizontal circular channels 48 are formed within table 11 so as to extend substantially parallel to the upper surface of the table. Two pairs of channels 48 are formed through the front end surface of table 11 and extend to the rear end surface of the table. Similarly shaped pairs of channels 50 extend from one side of table 11 towards the other side, generally perpendicular to channels 48. As shown in FIG. 8, the pair of channels 50 which begins on the left side of the table is offset from the pair of channels 50 which extends from the right side of the table. The function and structure of slots 13 and channels 48 and 50 are described in greater detail below.

Pivot assembly 20 further includes wishbone table assembly support (wishbone) 22 having center arm 24, and forwardly extending side arms 26. Center arm 24 includes circular portion 24a having central hole 24b and arc-shaped opening 24c formed therethrough. Locking clamp 25 is disposed through arc-shaped opening 24c. Locking clamp 25 is a conventional adjustable handle, and includes a cylindrical base, a handle portion extending obliquely from one end of the base, and a screw-threaded extension extending axially from the other end of the base. The screw-threaded end is disposed in corresponding screw-threading in circular plate 6. A washer is disposed about the screw-threaded end and frictionally engages the surface of wishbone 22 at the location of arcuate opening 24c when clamp 25 is tightened. Side arms 26 include forward ends 27 having upper and lower holes 27a and 27b. Forward ends 27 have a slightly greater vertical dimension than the remaining portions of side arms 26. Wishbone 22 is secured to circular plate 6 by pivot pin 23 disposed through central hole 24b and hole 6a formed in plate 6. Circular portion 24a includes scale 24d formed on the upper circumference.

When locking clamp 25 is rotated so as to loosen the engagement of the washer on circular portion 24a, wishbone 22 may be rotated about pivot pin 23 and thus about a horizontal axis which is generally perpendicular to the planes of plate 6 and circular portion 24a. The screw-threaded extension of clamp 25 slides within arcuate opening 24c during rotation. Since, as described further below, table 11 is secured to wishbone 22, table 11 also is pivoted about this axis. The degree of rotation with respect to the vertical of wishbone 22 is shown by pointer 6b on scale 24d. In particular, pointer 6b indicates the degree of rotation of table 11 with respect to a vertical plane which is perpendicular to the front and rear edges of the table. In other words, the scale indicates the degree of side to side rotation of table 11. Locking clamp 25 is tightened to secure wishbone 22 in the desired position.

Pivot assembly 20 further includes trunnions 30 having a semi-oval shape. Each trunnion 30 includes upper through holes 30a, central pivot hole 30b, and arcuate slot 30c formed through the lower periphery. Trunnions 30 are secured for pivoting motion, outwardly of each side arm 26 of wishbone 22, by pivot pins 31 disposed through pivot holes 30b and upper holes 27a. Conventional adjustable locking clamp 32 having the same structure as described for locking clamp 25 has a screw-threaded end disposed through arcuate slot 30c of each trunnion 30, and extending into screw-threaded lower holes 27b. Locking clamps 32 include washer elements 32a disposed adjacent the surface of trunnions 30. Clamps 32 may be tightened by rotation to force the washers into frictional engagement against the trunnions and securely clamp the trunnions against side arms 26 of wishbone 22, to thereby preclude the trunnions from pivoting relative to wishbone 22. Alternatively, clamps 32 may be rotated to release the frictional engagement and thereby allow trunnions 30 to pivot relative to side arms 26. During such pivoting of trunnions 30, arcuate slots 30c move along the locations where clamps 32 extend therethrough.

Figure 11A:
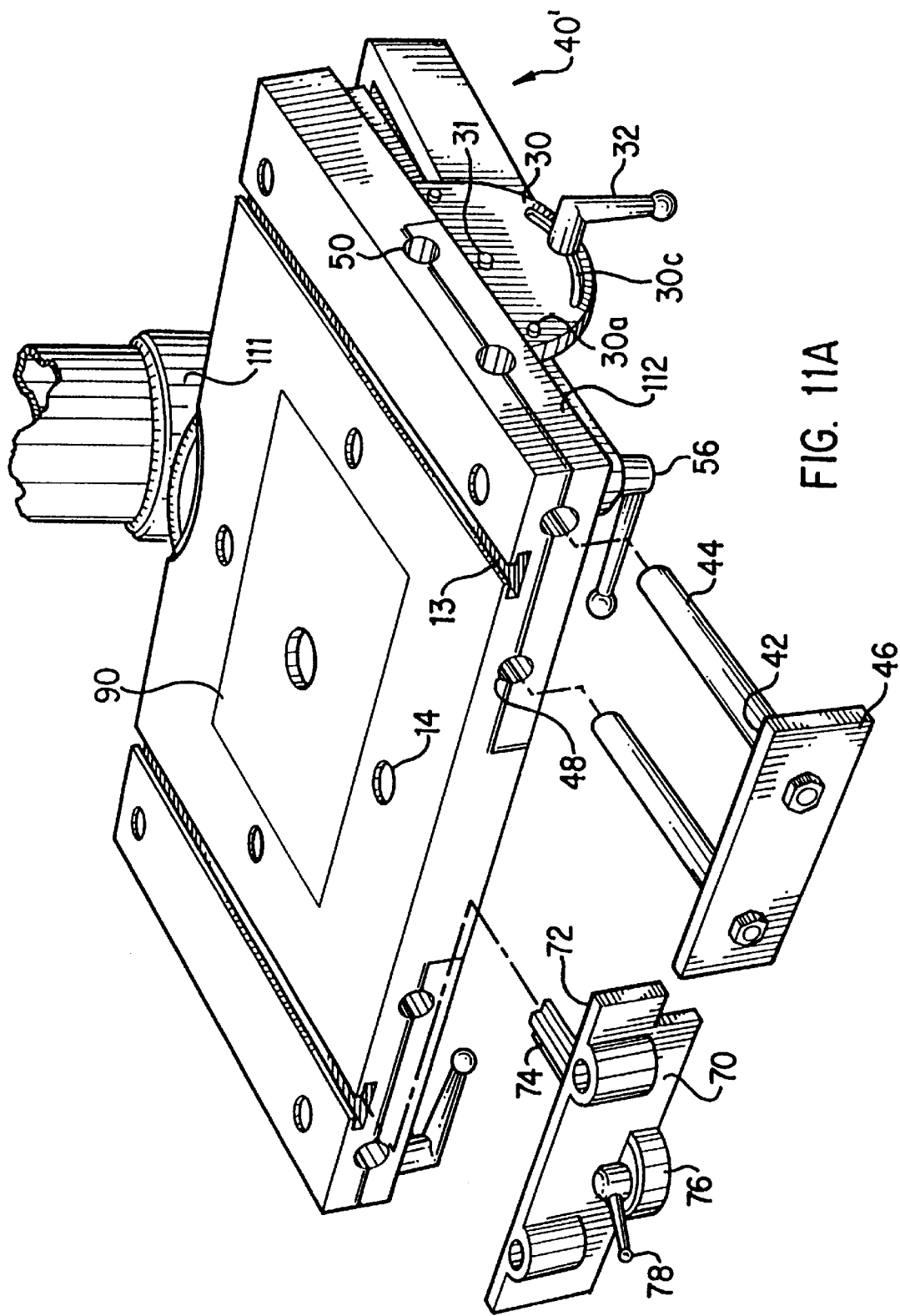
FIG. 11A is a perspective view showing a third embodiment of a drill press table assembly forming part of the drill press shown in FIG. 1.

Screws 34 extend through upper through holes 30a in trunnions 30 and corresponding holes 19a in brackets 19. Nuts 36 are disposed on the extending ends of screws 34 and thereby secure each side of table 11 to one trunnion 30. Table 11 may be pivoted from a generally horizontal position as shown FIGS. 2 and 5, about a horizontal axis parallel to the front and rear ends of the table, to a position in which the table is inclined forwardly downwardly with respect to the user, as shown in FIGS. 1 and 11a. Table 11 is allowed to pivot by loosening clamps 32 as described above to allow pivoting of trunnions 30, and is fixed in any desired angle by re-tightening the clamps. In a preferred embodiment, table 11 may pivot or tilt between at least 0° and 45° relative to a vertical plane which extends substantially parallel to the front and rear edges of the table. Trunnions 30 may also include scale 36 formed along arcuate slots 30c to show the pivot angle at which table 11 has been fixed.

With further reference to FIGS. 1, 2, 5, and 7, trunnions 30 also may include locking pins 38 which fit through an opening formed in the trunnions. Locking pins 38 include a protrusion which extends through trunnions 30 and into one of a plurality of holes 39 formed through side arms 26 at various locations along an arc which is centered about pivot holes 30b, that is, along an arc traversed by arcuate slots 30c when trunnions 30 are pivoted. The locations of holes 39 correspond to predetermined preferred pivot angles for table 11. Locking pins 38 are biased, for example, by spring biasing such that the protrusions extend through holes 39 to thereby lock trunnions 30 at one of the predetermined pivot angles. In order to adjust the pivot angle of table 11, locking pins 38 are pulled outwardly against the spring bias to remove the protrusions from holes 39 and thereby allow trunnions 30 to pivot. After a desired predetermined pivot angle is reached, locking pins 38 are released. If table 11 has been pivoted to one of the predetermined pivot angles, the protrusions will extend through the corresponding holes 39 and help secure trunnions 30 at the desired angle. If table 11 has not been pivoted to a predetermined pivot angle, the locking pin protrusions will simply rest against the surface of arms 26. In either case, locking clamp 32 will be re-tightened to secure table 11 in the desired position.

Figure 6:
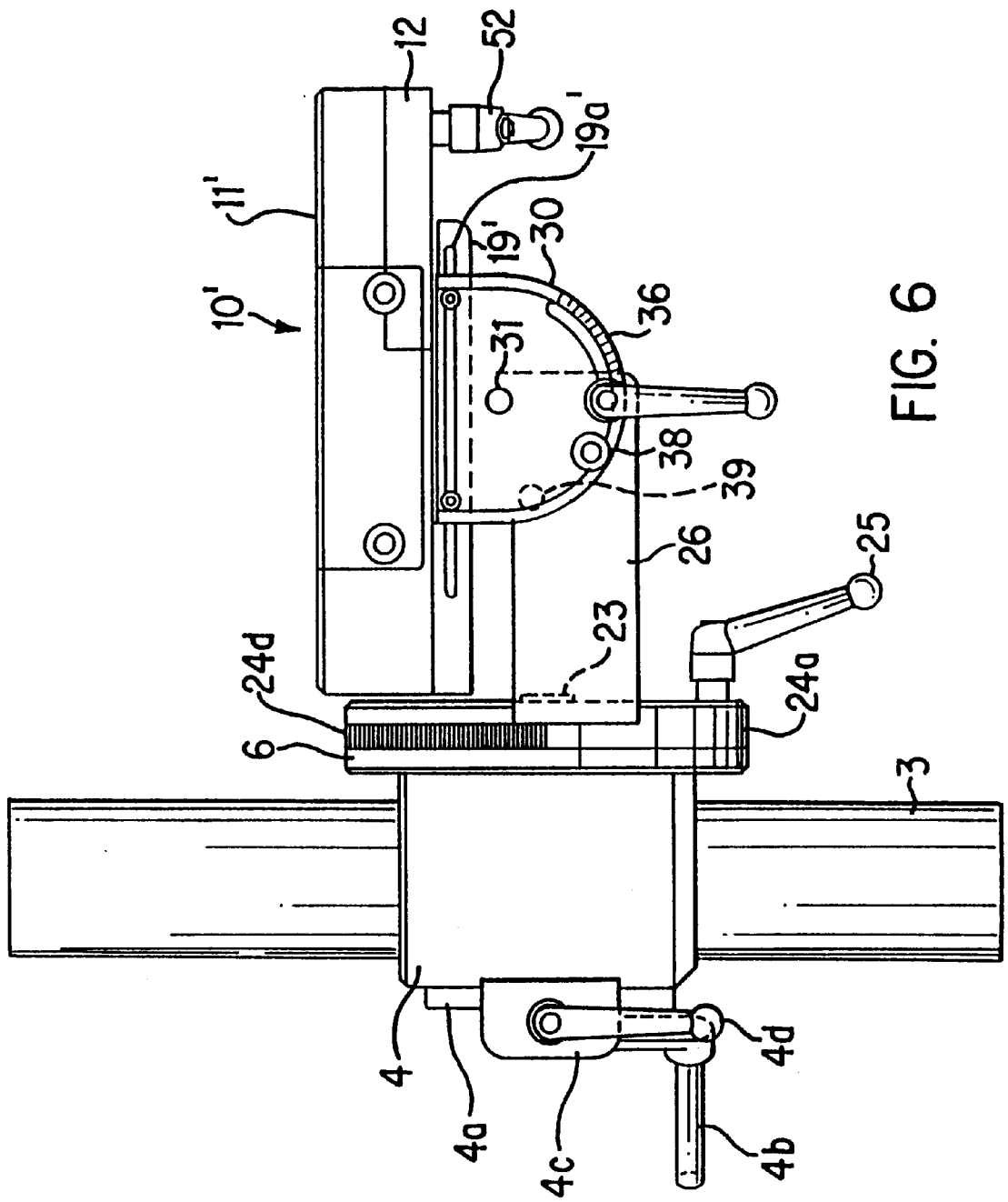
FIG. 6 is a left side elevational view of a second embodiment of a drill press table assembly forming part of the drill press shown in FIG. 1.

With reference to FIG. 6, a second embodiment of the table assembly is shown as table assembly 10'. Assembly 10' includes table 11' which includes brackets 19' having elongated slots 19a', instead of holes 19a as in table 11. Slots 19a' allow the horizontal position of table 11' to be adjusted relative to trunnions 30. In particular, the horizontal position may be adjusted by loosening nuts 36, and pulling or pushing table 11' to a desired position with screws 34 sliding in slots 19a'. The nuts are re-tightened to secure table 11' in the desired position. Accordingly, table 11' may be moved away from or towards support post 3. In all other respects, table assembly 10' is identical to table assembly 10.

With further reference to FIGS. 5–8A, a vertical height adjustment mechanism for table 11 is shown. The mechanism includes cylindrical casting 4 which is secured about support post 3. Casting 4 is split at the rear to form two "halves" which each include rearwardly extending clamping projection 4c having screw-threaded openings. Clamp arm 4d includes a screw-threaded projection which extends into the screw-threaded openings of clamping projections 4c. By rotating clamp arm 4d, projections 4c may be forced apart to thereby loosen the engagement of each "half" of casting 4 about support post 3. Casting 4 is then free to move along support post 3.

Casting 4 further includes height adjustment housing 4a having a conventional pinion gear (not shown) disposed therein and rotatable handle 4b linked to the pinion gear. The pinion gear meshes with rack 3a which extends along the length of support post 3 and is secured at the top within collar 3e and at the bottom by an upwardly extending portion 5a of base 5 so as to be freely rotatable about post 3. When handle 4b and thus the pinion gear are rotated, the gear moves along rack 3a to thereby raise or lower casting 4 along support post 3 to adjust the vertical position of wishbone 22 relative to support post 3. Thus the vertical position of table 11 may be adjusted. When table 11 is in its desired vertical position, clamp arm 4d is rotated to tighten projections 4c and secure casting 4 and thus table 11.

Figure 8A:
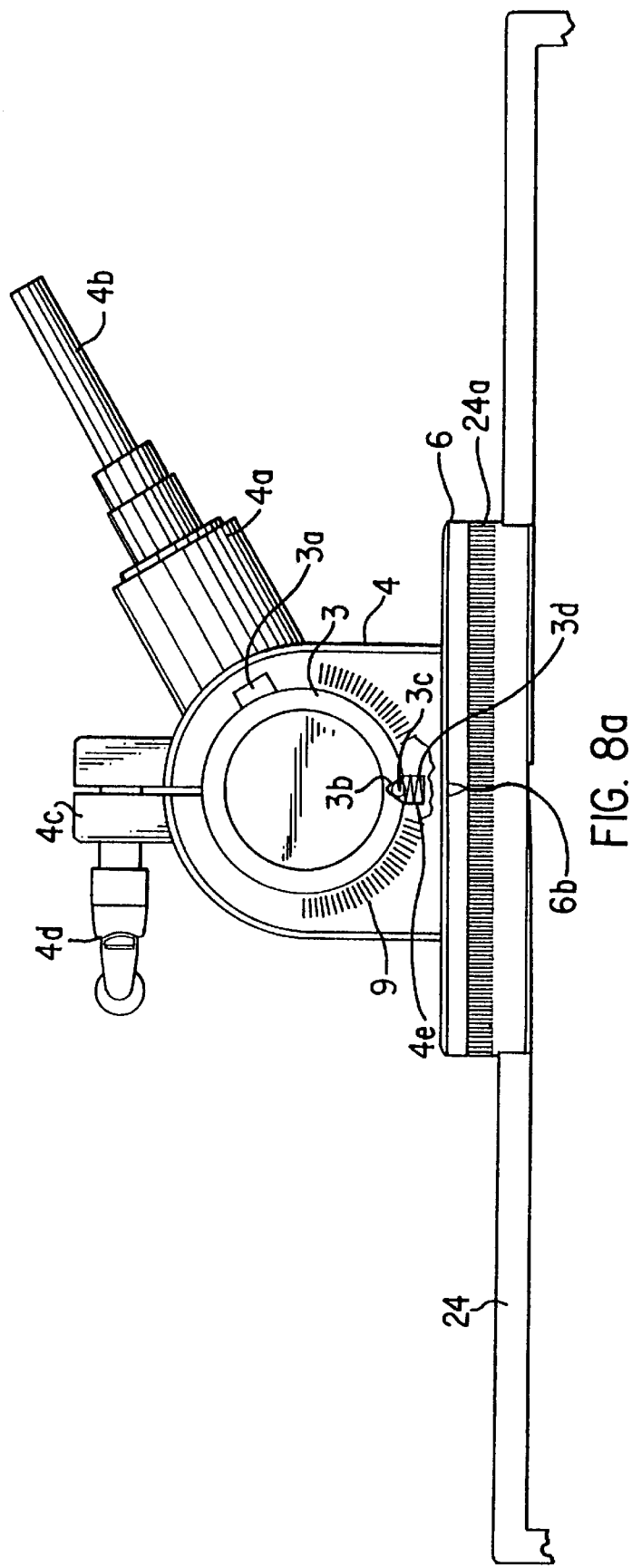
FIG. 8A is a close-up overhead view, partially in section, of a portion of the drill press shown in FIG. 8.
Figure 9:
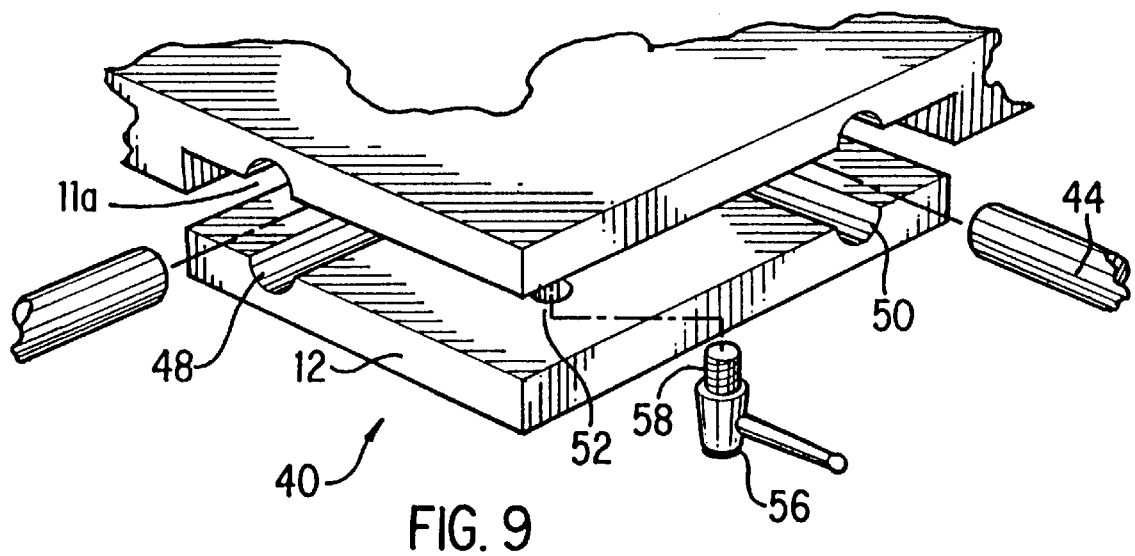
FIG. 9 is a perspective view showing a corner portion of the table assembly of FIG. 2.

As described above, rack 3a is freely rotatable about support post 3. Accordingly, when casting 4 is loosened by rotation of handle 4d, the casting may be freely rotated about post 3, with the pinion gear remaining in mesh with rack 3a and causing the rack to rotate about post 3. This rotatability of casting 4 allows table 11 to be pivoted about a vertical axis defined by post 3. With reference to FIG. 8A, support post 3 includes centrally located, vertically extending front notch 3b. Notch 3b is formed directly to the rear of the center of the drill chuck. Casting 4 includes rectangular notch 4e formed on the interior cylindrical surface. Notch 4e is located on a horizontal axis which extends through the center of table 22. Spring 3d is disposed in notch 4e and biases ball bearing 3c outwardly from notch 4e. When casting 4 and table 11 are rotated, ball bearing 3c is forced out of notch 3b against the spring bias. Ball bearing 3c is forced into notch 4e and rides along the surface of support post 3 during rotation. After rotation, when it is desired to re-center table 11 under the drill chuck, the table and casting 4 are rotated until notch 4e is opposite notch 3b. When the center location is reached, spring 3d biases ball bearing 3c back into notch 3b. Since the ball bearing and notches provide some resistance to rotation of casting 4, this arrangement identifies when table 11 has reached the center location. Thereafter, handle 4d is rotated to secure casting 4 and table 11 against further rotation.

As described above, the present invention provides a drill press in which the position of the table may be adjusted in four ways. Table 11 may be pivoted towards the user about a horizontal axis parallel to the front edge, or from side-to-side about a horizontal axis parallel to the side edges. The vertical height of the table also can be adjusted, and the table may be pivoted about a vertical axis. By making use of these four degrees of movement, a user may position the table and thus a workpiece in an optimum position.

With further reference to FIGS. 1 and 7–10B, telescoping extension arm assembly 40 forming part of the invention is disclosed. Assembly 40 includes clamp plates 12 disposed in cut-out regions 11a as described above, and telescoping extension arm 42. Extension arm 42 may be clamped by clamp plates 12 in any one of six positions extending outwardly from table 11 to provide support for the extending portion of a workpiece. Extension arm 42 includes a pair of cylindrical or tubular extension rails 44 and support plate 46 secured to the ends of rails 44 by a pair of nuts. Support plate 46 has an overall rectangular shape.

As described above, table assembly 10 includes two pair of horizontal channels 48 extending substantially parallel to the side edges of table 11 from the front and back edges of the table. Table assembly 10 also includes two pair of horizontal, generally circular channels 50 extending substantially parallel to the front edge of table 11 from the left and right edges of the table. Channels 48 and 50 have a substantially circular cross-section. With specific reference to FIGS. 6, 7 and 9, the laterally inner channel 48 of each pair is formed entirely within table 11. However, the outer channel 48 of each pair is formed by semi-circular openings disposed in the lower surface of table 11 at the locations of cut-out portions 11a and corresponding semi-circular openings formed in the upper surface of clamp plates 12. Similarly, the rear channel 50 of each pair is formed entirely within table 11, while the forward channel 50 of each pair is formed by openings in both table 11 and clamp plate 12. The diameter of channels 48 and 50 is substantially the same as the diameter of extension rails 44.

Vertical through holes 52 are formed in clamp plates 12 and corresponding screw-threaded openings 54 are formed in the lower surface of table 11. Holes 52 and openings 54 are offset from channels 48 and 50. Clamps 56 have screw-threaded ends 58 which are disposed through holes 52 and into openings 54 to adjustably secure clamp plates 12 within cut-out portions 11a. Clamps 56 may be rotated so as to loosely hold clamp plates 12 against the lower surface of table 11. Alternatively, clamps 56 may be tightened to securely hold clamp plates 12 against the lower surface of table 11. Support plate 46 is positioned outwardly of table 11 by inserting rails 44 within one pair of channels 48 or 50 when clamp plates 12 are only loosely held against table 11. When support plate 46 is positioned at any desired location relative to the edge of table 11, clamp 56 is then tightened to securely hold clamp plates 12 against the lower surface of table 11, thereby locking one extension rail 44 of arm 42 within the channel which is formed jointly by table 11 and clamp 12.

Figure 7:
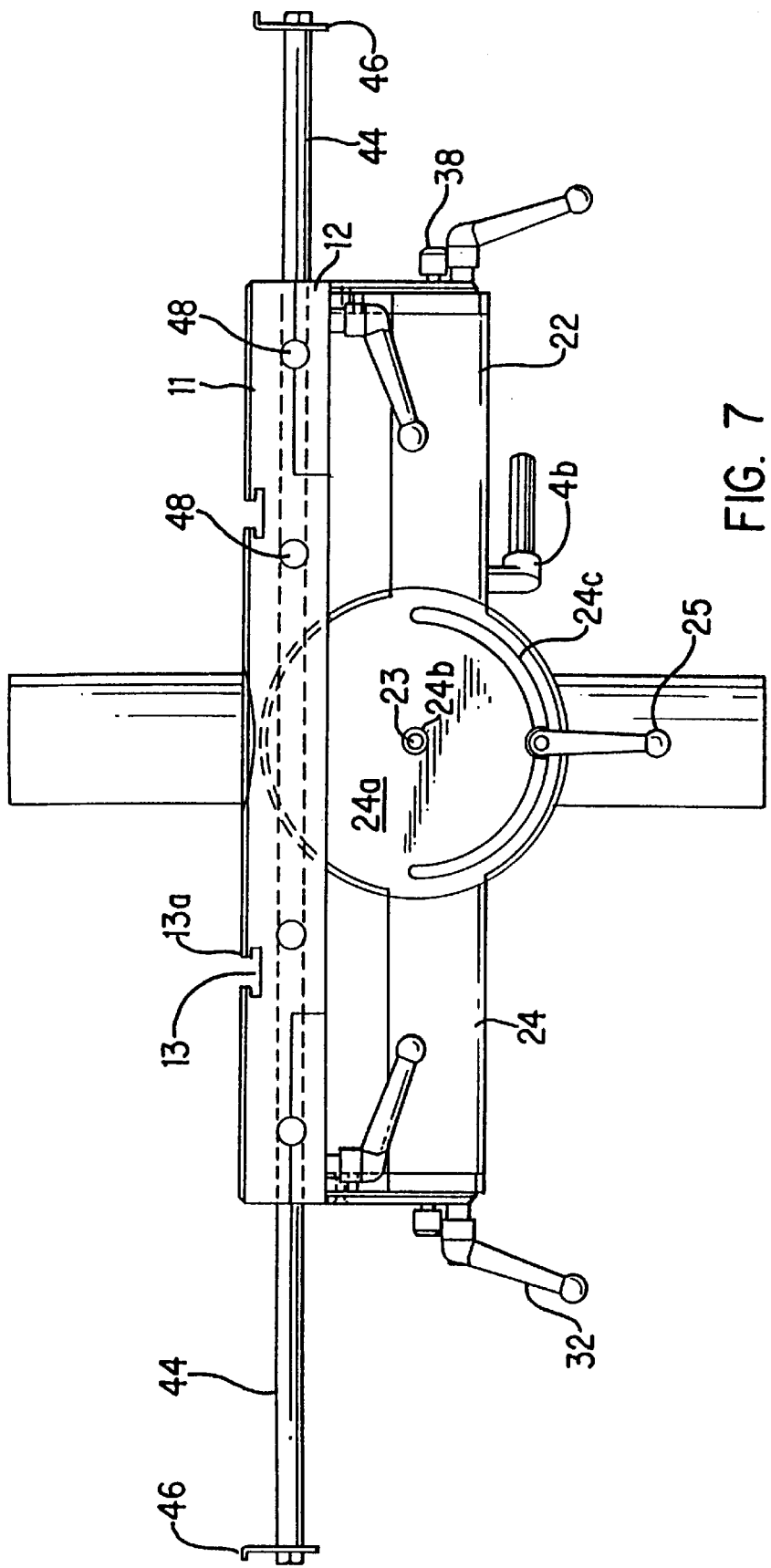
FIG. 7 is a front elevational view of the drill press table assembly shown in FIG. 2.
Figure 10A:
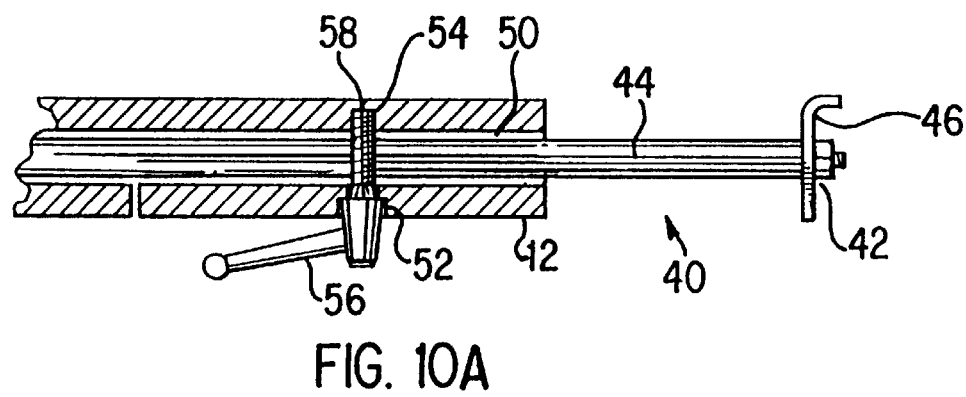
FIG. 10A is a cross-sectional view of the corner portion shown in FIG. 9.
Figure 10B:
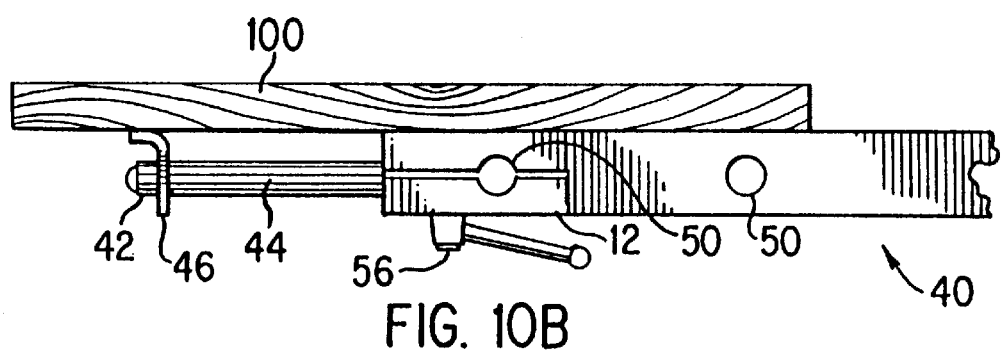
FIG. 10B is a side elevational view of the corner portion shown in FIG. 9.

Support plate 46 provides support for the extending portion of workpiece 100 as shown in FIG. 10b. Channels 48 open on both the left and right sides at the front and rear of table 11, and channels 50 open on the left and right edges of table 11. Thus, support plate 46 can be positioned outwardly of either the left or right edge of table 11, as shown in FIGS. 7 and 8. Alternatively, as shown in FIGS. 8 and 10a, support plate 46 can be positioned in front of or behind table 11 on either the right or left side. Furthermore, two extension arms 42 can be secured to table 11 at any time. In particular, since channels 50 extending from the left side of table 11 are offset from channels 50 extending from the right side, each extension arm 42 may be inserted in one pair of channels 50 so as to allow plates 46 to extend from the opposite sides of table 11, as shown in FIG. 8. Alternatively, one arm 42 can be inserted in each pair of channels 48 so as to provide plates 46 extending from each side of the front or back of table 11. Accordingly, either the effective width or the effective length of table 11 may be increased.

Figure 11B:
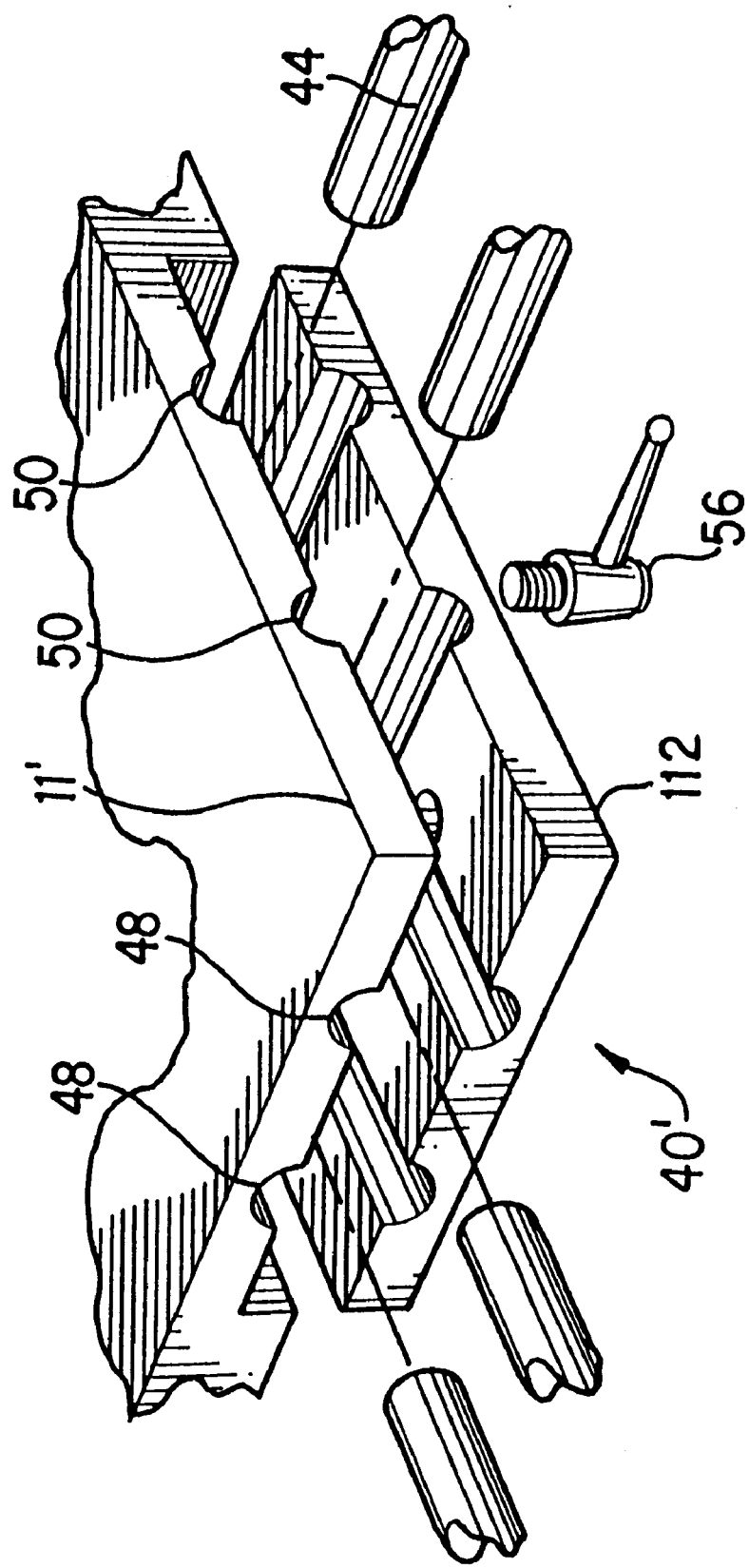
FIG. 11B is a close-up perspective view showing a corner portion of the drill press table assembly of FIG. 11A.

With reference to FIGS. 11A and 11B, a second embodiment of the telescoping extension arm assembly is shown. Telescoping assembly 40' includes table 111 and clamp plates 112 in which both channels of each pair of channels 48 and 50 are formed by semi-circular openings disposed in the lower surface of table 111 at the locations of cut-out portions 11a and corresponding semi-circular openings formed in the upper surface of clamp plates 112. Thus, both rails 44 of extension arms 42 are clamped between table 111 and plates 112. In all other respects, assembly 40' is identical to assembly 40.

Though the telescoping extension arm assembly has been described as including clamp plates 12 and 112 which fit within cutout portions of table 11 and 111, it is understood that telescoping extension arms 42 may be clamped in other ways. For example, table 11 need not include cutout regions and may have a substantially constant cross section. Rails 44 may include a plurality of through holes which may be lined-up with screw-threaded through holes formed directly in the table. The screw-threaded end of the locking clamp would extend through the holes of rails 44 within table 11 to secure the rails at a desired location. Furthermore, though holes 48 and 50 and rails 44 have been described as circular, other shapes could be used as well. For example, the holes and rails could have a rectangular or square cross-section.

With further reference to FIGS. 4 and 14–16, a sliding guide fence and vertical clamp assembly are shown. Sliding guide fence 70 includes vertical fence wall 72 having a flat rear surface and integrally formed lower guide rail 72a which extends downwardly from fence wall 72. Guide rail 72a has a rectangular cross-section and extends from just in front of wall 72 to a termination point to the rear of wall 72. Handle mount 76 also is integrally formed with wall 72 and has a semi-oval shape. Mount 76 extends from the front of wall 72, at a location above guide rail 72a. Through hole 76a extends through mount 76 and guide rail 72a. Bolt 74 is square or rectangular and includes screw-threaded opening 74a. Bolt 74 is disposed below guide rail 72a such that opening 74a is coincident with opening 76a. Guide rail 72a and bolt 74 jointly have a T-shaped cross-section generally corresponding to the cross-section of T-shaped slots 13 of table 11. In particular, the width of guide rail 72a is about the same as the distance between opposite overhanging lips 13a and the width of bolt 74 is about the same as the width of slots 13 below lips 13a.

Handle 78 is conventional and includes shaft 78b having a screw-threaded lower end which extends through opening 76a and into screw-threaded opening 74a of bolt 74. Handle 78 further includes cylindrical support 78a, and handle arm 78c integrally formed with and extending from support 78a. Support 78a is disposed about shaft 78b such that when arm 78c and support 78a are raised, support 78a may rotate relative to shaft 78b, thereby allowing the position of arm 78c relative to wall 72 to be adjusted. However, when arm 78c and support 78a are lowered, rotation of arm 78c and support 78a causes rotation of shaft 78b.

In order to secure guide fence 70 at a desired location on table 11, guide rail 72a and loosened bolt 74 are slidingly received in one of T-shaped slots 13. Accordingly, fence wall 72 of guide fence 70 may be positioned at any location from the front to the rear edge of table 11. When the desired location is reached handle arm 78c and support 78a are rotated while in the lower position, thereby causing rotation of screw-threaded shaft 78b. Since bolt 74 has generally the same width as slot 13 below lips 13a and a greater width than the distance between lips 13a, bolt 74 is constrained from rotation, and is instead raised upwardly towards the lower surface of guide rail 72a and overhanging lips 13a of slot 13. Bolt 74 is brought into tight frictional engagement with lips 13a to thereby secure guide fence 70 at the desired location. By rotation of handle arm 78c in the opposite direction, bolt 74 may be loosened, allowing guide fence 70 to be moved along the surface of table 11, or removed entirely from table 12.

Figure 4:
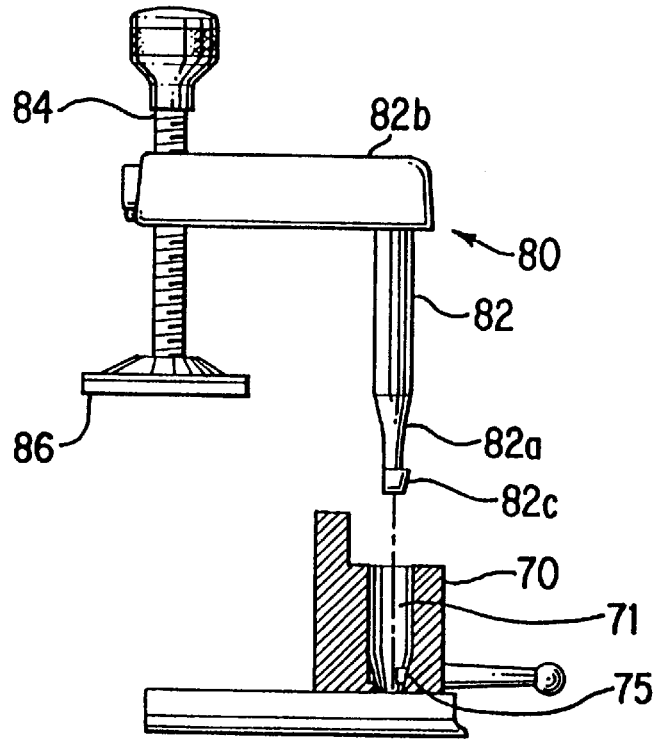
FIG. 4 is a side elevational view of a fence and clamp assembly forming part of the drill press according to the invention.
Figure 5:
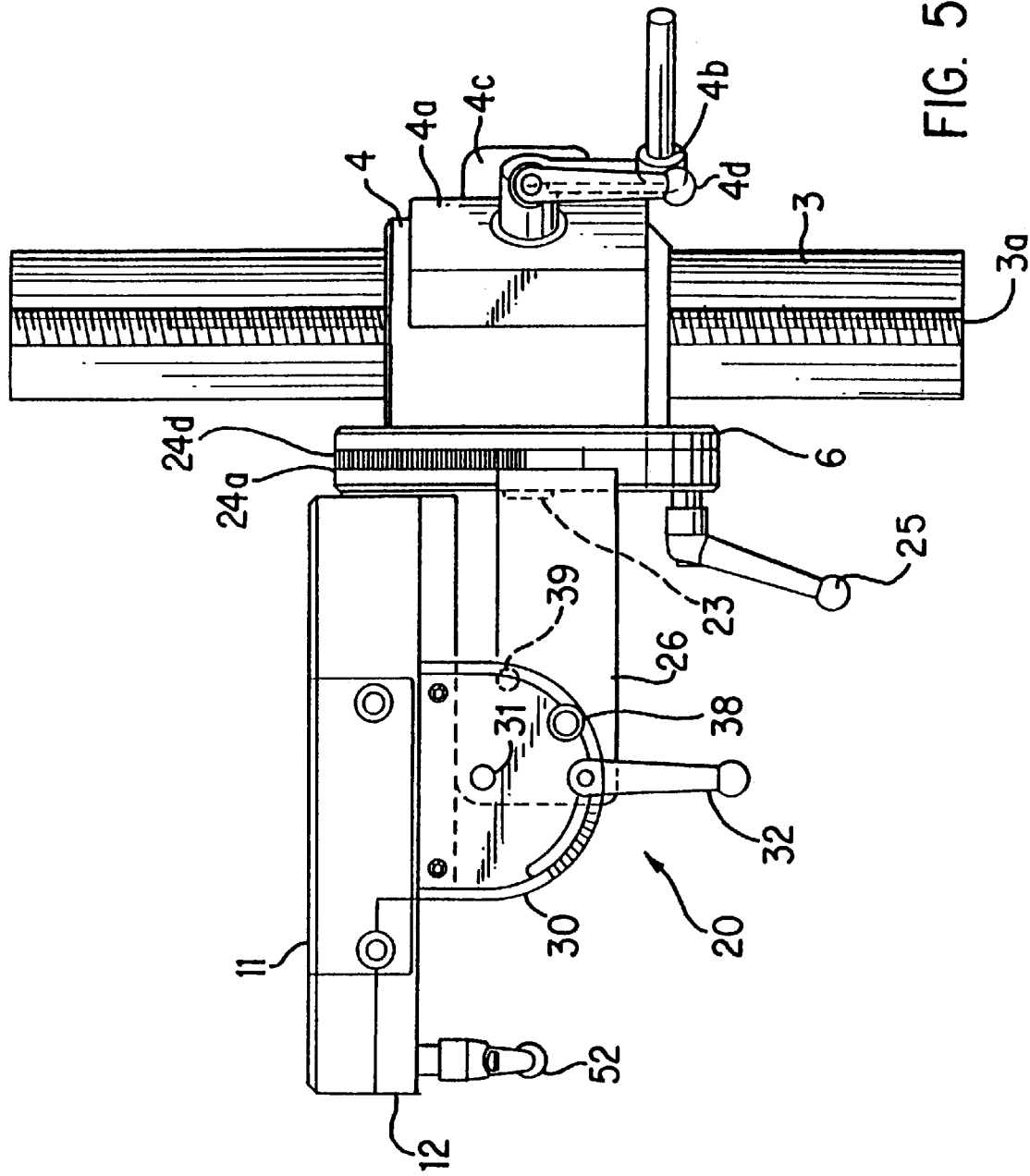
FIG. 5 is a right side elevational view of the drill press table assembly shown in FIG. 2.

Guide fence 70 further includes two vertically extending cylindrical holes 71. Holes 71 are disposed on opposite sides of mount 76, and are formed partially within the plane of wall 72 and partially within semi-cylinders 73 which extend outwardly from the front face of wall 72. Overhanging flats 75 are disposed within holes 72, and project inwardly from one side. With reference to FIG. 4, clamps 80 may be disposed within holes 71. Clamps 80 include support arm 82 having upper horizontal portion 82b and vertical pole portion 82a extending downwardly from one end of portion 82b. Pole portion 82a is cylindrical and at the lower end has a decreasing diameter which expands into knob 82c. Knob 82c has an upper projecting lip which extends partially around the upper circumference. Pole 82a fits within hole 71 and is secured therein by rotating the upper projection lip so as to engage beneath flat 75. Clamps 80 also include screw-threaded shaft 84 which fits within a corresponding screw-threaded opening in upper horizontal portion 82b. Clamp disc 86 is secured at the lower end of shaft 84. By rotating shaft 84, clamp disc 86 may be raised or lowered.

As discussed, guide fence 70 may be slided along either one of guide slots 13 and then locked in the desired location. Wall 72 of fence 70 provides support for one side of a workpiece to help maintain the position during operation of the drill press. The position of the workpiece can be further secured by use of clamp 80 which is inserted in guide fence 70 with knob 82c secured under flat 75. Clamp plate 86 is then lowered into contact with a workpiece to secure the position. Alternatively, clamps 80 may be disposed directly within holes 14 disposed through the upper surface of table 11, at various locations. Holes 14 include flats or lips 14a under which knobs 82c would be disposed to secure clamps 80 in place.

With reference to FIGS. 1, 3, 12 and 13, a removable inner table and router attachment is shown. Table 11 includes a square center opening having inwardly projecting ledges 92 around the periphery. Inner table 90 is removably disposed in the opening and rests upon ledges 92. This removability of inner table 90 allows the table to be replaced when worn out due to use of the drill press, without requiring that the entire table 11 be replaced. Since the center portion of the table is most likely to wear out under long-term use, the provision of a removable center table insert provides for economical maintenance of the drill press.

Figure 12:
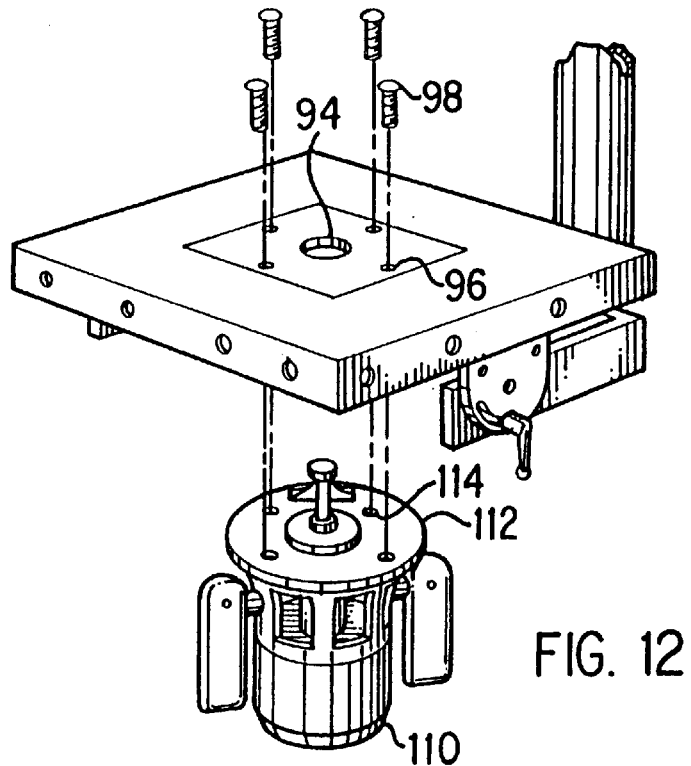
FIG. 12 is a perspective view showing a router attachment table forming part of the drill press shown in FIG. 1.
Figure 13:
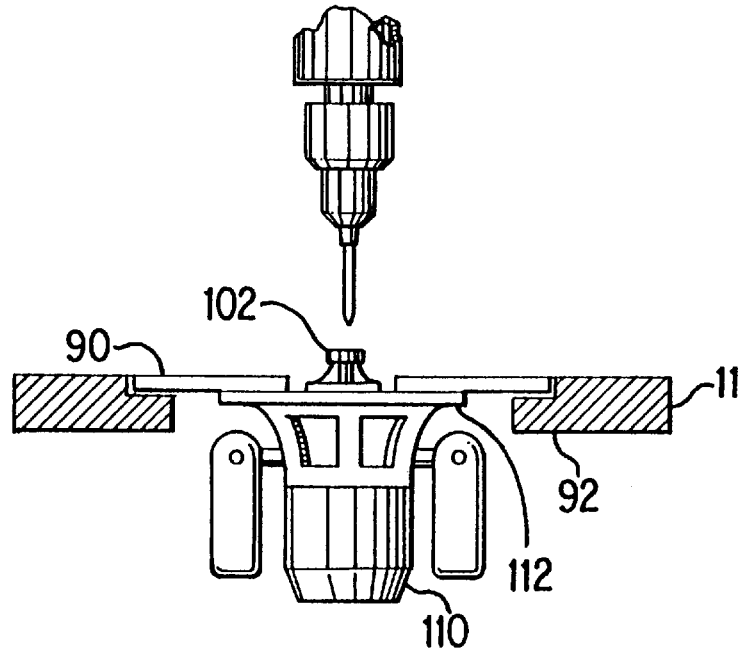
FIG. 13 is a front elevational view showing the router attachment table of FIG. 12.
Figure 14:
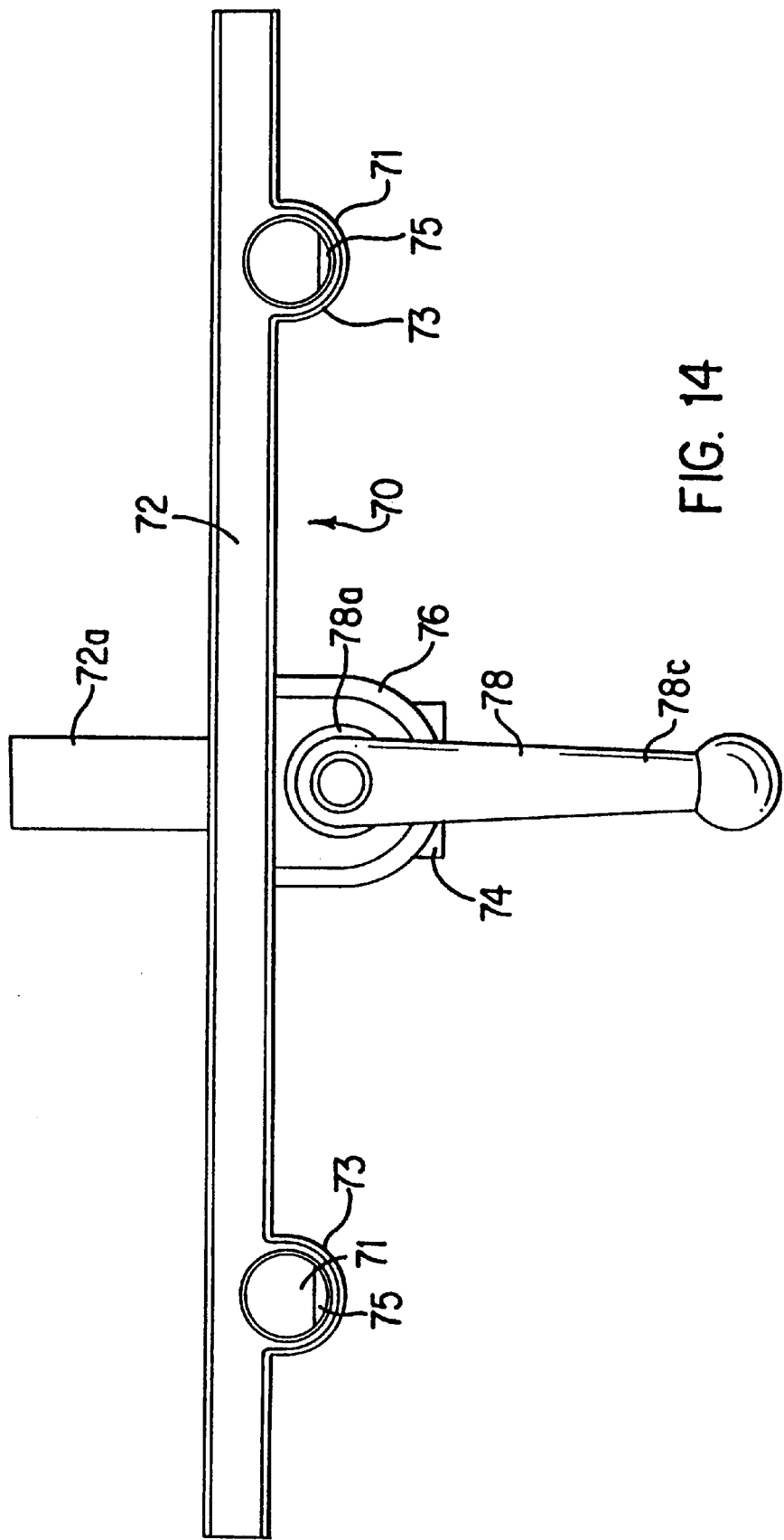
FIG. 14 is a top plan view of a sliding fence assembly forming part of the drill press shown in FIG. 1.
Figure 15:
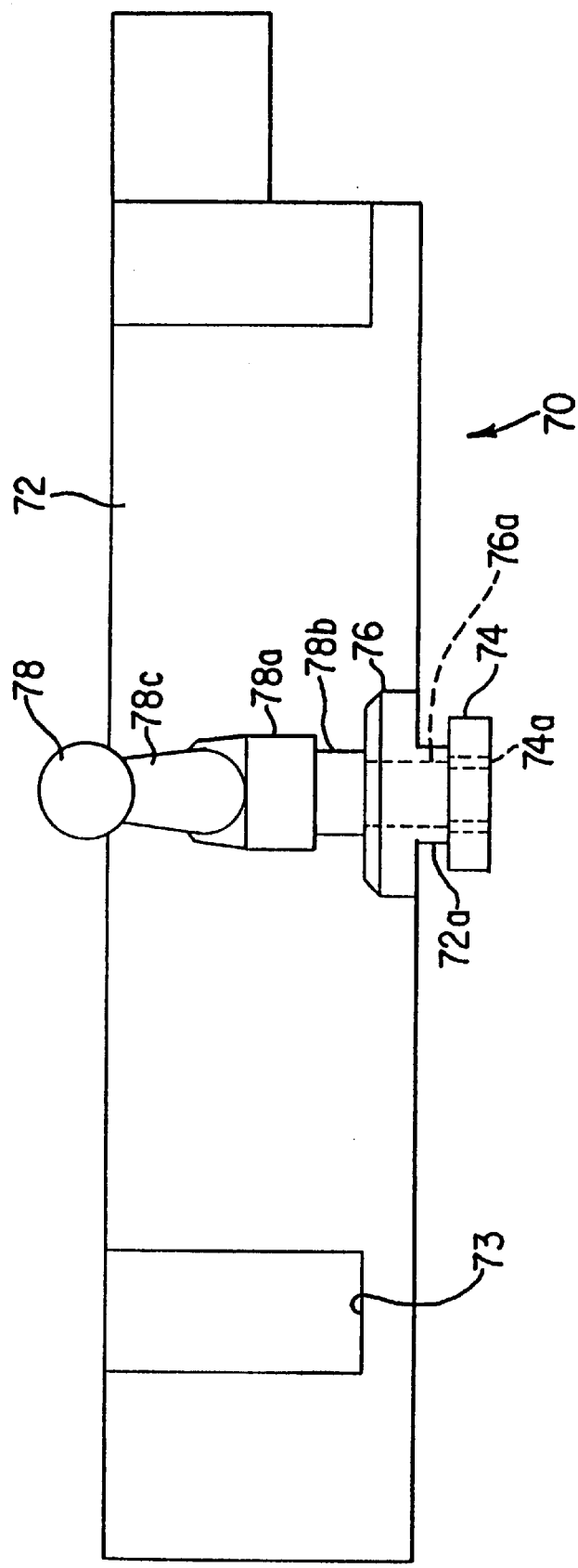
FIG. 15 is a front elevation view of the fence assembly shown in FIG. 14.
Figure 16:
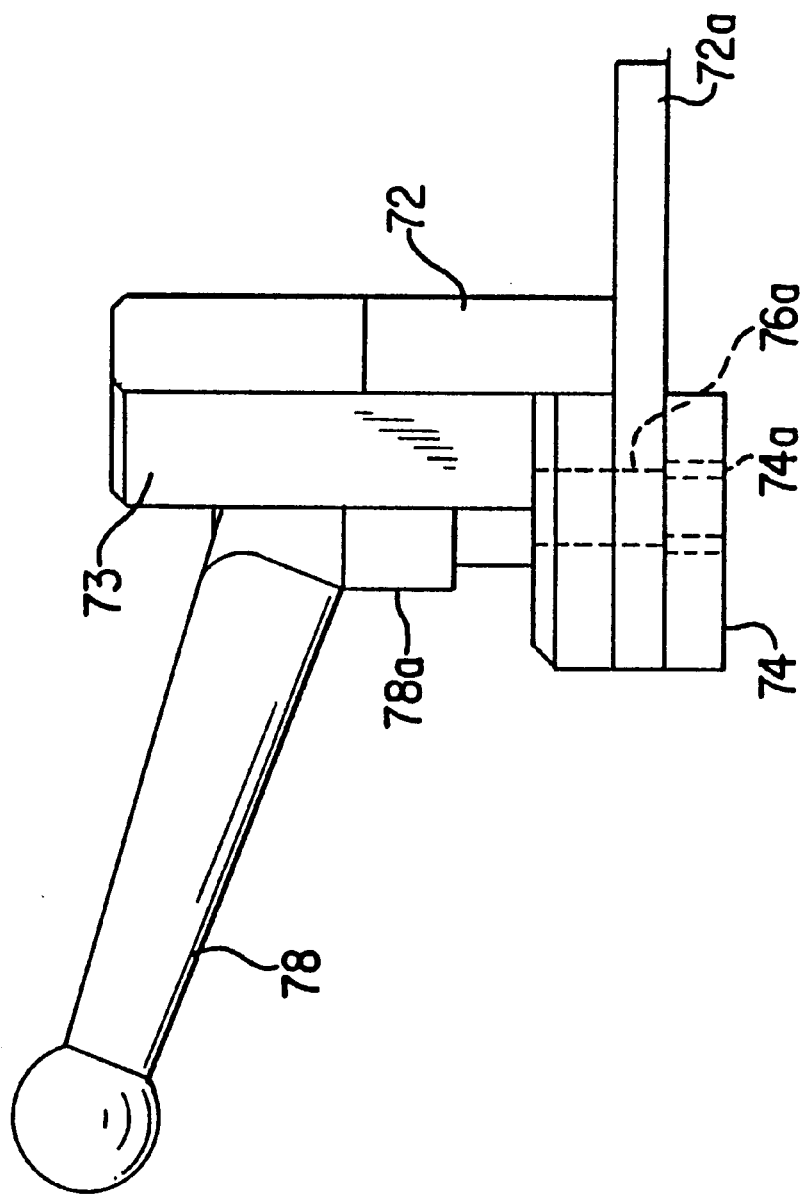
FIG. 16 is a right side elevational view of the fence assembly shown in FIG. 14.

With further reference to FIGS. 8, 12 and 13, inner table 90 includes center circular opening 94, and four smaller screw openings 96 disposed about center opening 94. Screw openings 96 are disposed generally equidistant along the periphery of a circle having opening 94 at the center. Conventionally operating router 110 includes router bit 102 extending through an opening in disc 112 secured to the lower surface of the router. Disc 112 includes a plurality of screw-threaded holes 114 formed at locations which correspond to the locations of screw holes 96 in inner table 90. Router 110 is inverted and removably secured to inner table 90 by a plurality of screws 98 disposed through holes 96 and 114, with router bit 102 extending through circular opening 94. Accordingly, the chuck of a drill press according to the present invention may also be used to hold a guide pin as in a conventional pin router. As shown in FIG. 13, router bit 102 will be axially aligned with the guide pin. Alternatively, if it is desired to have the router bit off-center with respect to the guide pin, such off-centering can be obtained by pivoting table 11 about the vertical axis defined by support post 3, as described above. Though inner table 90 is shown as including provisions for a router attachment, table 90 also can be provided without such an attachment.

We claim:

1. A drill press comprising:
   a vertical support post;
   a pivot assembly supported upon said support post;
   a table supported on said pivot assembly;
   a head supported by said post;
   a rotatable chuck supported by said head; and
   a switched reluctance motor driving the chuck;
   wherein the pivot assembly is pivotable about a substantially horizontal first axis, with the table pivoting about the first axis jointly with the pivot assembly, the table is pivotable relative to the pivot assembly about a substantially horizontal second axis, and the table is movable relative to the pivot assembly towards or away from the post,
   the pivot assembly comprising a table support having a center arm and side arms extending from the center arm, the center arm secured to the post so as to be pivotable about the first horizontal axis with the first horizontal axis intersecting the post, and a trunnion secured to each side arm, the trunnions being pivotable relative to the side arms about the second horizontal axis, and the trunnions being secured to the table.

2. The drill press of claim 1, further comprising means for raising and lowering the chuck relative to the table.

3. The drill press of claim 1, wherein said pivot assembly is movable in the vertical direction along said post and fixable in a selected vertical location to thereby allow said table to be pivoted about the vertical axis and fixed in a selected vertical location.

4. The drill press of claim 1, wherein said second axis is substantially perpendicular to said first axis.

5. The drill press of claim 1, at least one said trunnion including a biased locking pin extending therethrough, at least one said side arm including a plurality of holes formed therethrough along an arc substantially centered about said second horizontal axis, wherein, when said biased locking pin is disposed adjacent one of said holes, said pin will be biased into said hole to lock said at least one trunnion at a predetermined pivot angle about said second horizontal axis.

6. The drill press of claim 1, said table including brackets having slots, said table secured to said trunnions by fasteners extending through said trunnions and said slots, so that said table is movable towards or way from said post with said fasteners sliding in said slots.

7. The drill press of claim 1, wherein said table has an upper surface, said upper surface including a plurality of holes, the drill press further comprising a clamp including a support arm removably disposable within said holes to removably secure said clamp to said table, said clamp further including a vertically movable clamping element which may be lowered to secure a workpiece against said table and which may be raised to release a workpiece.

8. The drill press of claim 1, wherein said table has an upper surface with an opening, further comprising an inner table removably disposable and supportable within said opening.

9. The drill press of claim 8, said table including ledges disposed about the periphery of said opening, said inner table resting upon said ledges.

10. The drill press of claim 1, further comprising a router secured to said table in an inverted position, said router comprising a router bit, said router bit extending through an opening in the table.

11. The drill press of claim 1, wherein the pivot assembly is pivotable about the post.

12. The drill press of claim 11, further comprising a detent mechanism disposed between the pivot assembly and the post for identifying when said table is in a central location under said chuck.

13. The drill press of claim 12, wherein said detent mechanism comprises a spring disposed in said pivot assembly, a ball biased against the post by said spring, and a indexing notch in said post for receiving the ball.

14. The drill press of claim 1, wherein the head is disposed above the table.

15. A drill press comprising:
   a vertical support post;
   a pivot assembly supported upon said support post;
   a table supported on said pivot assembly;
   a head supported by said post;
   a rotatable chuck supported by said head;
   a switched reluctance motor driving the chuck;
   a clamp plate adjustably secured to said table, the table and the clamp plate joining defining a first channel; and
   a telescoping extension arm comprising an extension rail fixably securable at selected locations relative to said table by said clamp plate;
   said rail is slidably disposable within said first channel and may be clamped between said clamp plate and said table to fixably secure said arm.

16. The drill press of claim 15, said table defined by upper and lower surfaces and sides and ends, said table having a reduced thickness at a corner to form a cut-out region, said clamp plate fitting within said cut-out region, said table including an opening extending from one of the side and ends of the table, said clamp plate including a corresponding opening such that when said clamp plate is located in said cut-out region, said openings jointly define a portion of said first channel with said-channel extending between the upper and lower surfaces.

17. The drill press of claim 16, said table further including a second channel formed entirely within said table, said arm including a second extension rail, wherein, said second extension rail is slidably disposable within said second channel.

18. The drill press of claim 15, said table and said clamp plate jointly defining a second channel extending between the upper and lower surfaces, said second channel extending substantially perpendicular to said first channel, wherein, said rail is slidably disposable within said second channel and may be clamped between said clamp plate and said table.

19. The drill press of claim 15, said table including a screw-threaded opening, said clamp plate including a vertical through hole formed at a location corresponding to said screw-threaded opening, said drill press further including a clamp having a screw-threaded end which may be disposed through said through hole and into said screw-threaded opening to adjustably secure said clamp plate to said table.

20. The drill press of claim 15, wherein the head is disposed above the table.

21. A drill press comprising:

a vertical support post;

a pivot assembly supported upon said support post;

a table supported on said pivot assembly;

a head supported by said post;

a rotatable chuck supported by said head;

a switched reluctance motor driving the chuck;

wherein said table has an upper surface and a slot extending along said upper surface, and the drill press further comprising a guide fence slidably disposable along said upper surface of said table and securable at selectable locations, wherein the guide fence comprises a guide rail, said guide rail slidably fitting within said slot, said guide rail including an opening, said guide fence including a bolt having a screw-threaded opening, said bolt disposed below said guide rail within said slot and with said bolt opening coincident with said rail opening, said guide fence further including a screw-threaded shaft extending through said rail opening and into said bolt opening, said slot having overhanging lips, wherein, when said shaft is rotated in a first direction, said bolt is raised towards said lips to secure said guide fence at a selected location and when said shaft is rotated in a second direction, said bolt is lowered away from said lips to allow said guide fence to be slided along said slot.

22. The drill press of claim 21, said guide fence including a vertically extending cylindrical hole, said drill press further comprising a clamp removably disposable within said hole, said clamp including a vertically movable clamping element which may be lowered to secure a workpiece against said table and which may be raised to release a workpiece.

23. The drill press of claim 21, wherein the head is disposed above the table.

* * * * *